(12) United States Patent
Haneda

(10) Patent No.: US 10,826,419 B2
(45) Date of Patent: Nov. 3, 2020

(54) BRAKE DEVICE FOR AC GENERATOR

(71) Applicant: NTN CORPORATION, Osaka (JP)

(72) Inventor: Masaji Haneda, Omihachiman (JP)

(73) Assignee: NTN CORPORATION, Osaka (JP)

( * ) Notice: Subject to any disclaimer, the term of this patent is extended or adjusted under 35 U.S.C. 154(b) by 117 days.

(21) Appl. No.: 16/088,027

(22) PCT Filed: Mar. 15, 2017

(86) PCT No.: PCT/JP2017/010308
§ 371 (c)(1),
(2) Date: Sep. 24, 2018

(87) PCT Pub. No.: WO2017/164022
PCT Pub. Date: Sep. 28, 2017

(65) Prior Publication Data
US 2019/0165709 A1 May 30, 2019

(30) Foreign Application Priority Data

Mar. 22, 2016 (JP) .................. 2016-056581

(51) Int. Cl.
| | |
|---|---|
| *F03D 9/00* | (2016.01) |
| *H02P 9/04* | (2006.01) |
| *H02P 9/08* | (2006.01) |
| *H02P 9/00* | (2006.01) |
| *H02P 3/00* | (2006.01) |
| *F03D 9/25* | (2016.01) |
| *F03D 7/02* | (2006.01) |
| *H02P 101/15* | (2016.01) |

(52) U.S. Cl.
CPC .............. *H02P 9/08* (2013.01); *F03D 7/0244* (2013.01); *F03D 9/25* (2016.05); *H02P 3/00* (2013.01); *H02P 9/00* (2013.01); *F05D 2220/768* (2013.01); *F05D 2270/021* (2013.01); *H02P 2101/15* (2015.01)

(58) Field of Classification Search
CPC . H02P 9/08; H02P 3/22; F03D 7/0244; F03D 7/0272
See application file for complete search history.

(56) References Cited

U.S. PATENT DOCUMENTS 3,573,580 A * 4/1971 Shinozaki ................ H02P 1/28
318/778
3,663,947 A 5/1972 Pfefeer
(Continued)

FOREIGN PATENT DOCUMENTS

| EP | 1555536 A2 | 7/2005 |
|---|---|---|
| FR | 2021030 A1 | 7/1970 |

(Continued)

OTHER PUBLICATIONS

Japan Patent Office, International Search Report and Written Opinion of the International Searching Authority in PCT/JP2017/010308, dated May 23, 2017, which is the international application to this U.S. application.

*Primary Examiner* — Tulsidas C Patel
*Assistant Examiner* — Thomas K Quigley
(74) *Attorney, Agent, or Firm* — Kolitch Romano LLP

(57) ABSTRACT

A brake device for an AC generator, whose speed can be flexibly controlled, and can function properly even when functions of the control unit are lost.

9 Claims, 4 Drawing Sheets

(56) References Cited

U.S. PATENT DOCUMENTS

| | | | | |
|---|---|---|---|---|
| 4,482,853 | A * | 11/1984 | Bhavsar | H02P 3/24 |
| | | | | 318/759 |
| 6,653,806 | B1 * | 11/2003 | Ono | B60L 7/06 |
| | | | | 318/375 |
| 8,179,082 | B2 * | 5/2012 | Li | H02P 1/30 |
| | | | | 318/778 |
| 8,796,970 | B2 * | 8/2014 | Aarestrup | H02K 3/28 |
| | | | | 318/400.26 |
| 9,160,257 | B2 * | 10/2015 | Hua | H02P 1/26 |
| 2011/0056715 | A1 * | 3/2011 | Vanko | H02P 3/22 |
| | | | | 173/176 |
| 2014/0103939 | A1 | 4/2014 | Chartroux et al. | |
| 2015/0303676 | A1 * | 10/2015 | Hertz | H02H 3/08 |
| | | | | 361/31 |

FOREIGN PATENT DOCUMENTS

| | | |
|---|---|---|
| JP | S4841842 B1 | 12/1973 |
| JP | S5012761 B1 | 5/1975 |
| JP | H0823700 A | 1/1996 |
| JP | 2000-199473 A | 7/2000 |
| JP | 2007-189770 A | 7/2007 |
| JP | 2008-118807 A | 5/2008 |
| JP | 2016-063622 A | 4/2016 |
| WO | 2013/013678 A2 | 1/2013 |

* cited by examiner (a) Vu>Vw (b) Vu<Vw

BRAKE DEVICE FOR AC GENERATOR

CROSS-REFERENCE TO RELATED APPLICATIONS

This application is a national phase application of PCT/JP2017/010308, filed Mar. 15, 2017, which claims priority to Japanese Application No. 2016-056581, filed Mar. 22, 2016, each of which is hereby incorporated by reference.

FIELD

The invention relates to a brake device for an AC generator in a wind-power generation device and the like.

BACKGROUND

In a wind-power generation device, when the rotational speed of a windmill, i.e., the rotational frequency exceeds a prescribed value, in order to protect the windmill and the AC generator connected thereto, a mechanism to generate a brake torque to reduce the rotational speed of the windmill is known. One of the simplest functions is a mechanical brake. A disk brake is a major form of the mechanical brake, and since a sudden brake causes a lot of strain to the windmill, the mechanical brake is usually used at the last stage of the last minute of a halt. Further, as for a regeneration brake which is to regenerate a current from an electric motor and the like connected to a load, how well such a brake functions depends on load conditions.

Japanese Unexamined Patent Application Publication Nos. 2000-199473 and 2007-189770 disclose the way of generating a brake torque at an AC generator by increasing the output current by way of an electrical short circuit and the like of the output terminal of the AC generator, and the way of using such brake torque as a brake force for the windmill.

Japanese Unexamined Patent Application Publication No. 2000-199473 discloses a protective device which short-circuits the output of the AC generator by closing the switch when an output frequency of the AC generator exceeds the prescribed frequency. This is made possible by the fact that since the rotational frequency of the windmill and the output frequency of the AC generator are proportional, the rotational frequency of the windmill is to be monitored by detecting the output frequency of the AC generator. A timer is used to prevent a frequent switching of the switch. In structures described in Japanese Unexamined Patent Application Publication No. 2000-199473, once the switch is closed, such switch will remain closed until a prescribed period of time of the timer has elapsed. Accordingly, once the SW is closed, a sudden change of a brake torque occurs on the AC generator, which causes a great deal of machinery stress on the AC generator and the windmill.

In Japanese Unexamined Patent Application Publication No. 2007-189770, a device is equipped with a means to detect the rotational speed of the AC generator and a power converter to change the magnitude of a DC power by the timing of switching on/off of a switching element placed after rectifying the output current of the AC generator. With such means, if the rotational speed exceeds, a gradual increase of a conduction rate until the switching element remains always on will achieve an increase of the output current of the AC generator and a generation of a brake torque at the AC generator. In such method described in Japanese Unexamined Patent Application Publication No. 2007-189770, as the output current of the AC generator is increased over time without causing any sudden change in the current which runs through the AC generator, braking of the windmill can be applied without causing a machinery stress.

SUMMARY

The device in Japanese Unexamined Patent Application Publication No. 2007-189770 features no occurrence of a sudden brake torque as the output current of the AC generator is increased over time. Even if the conduction rate of the switching element is 100%, the current is less than that of short-circuit. Thus, if the rotational speed goes over a controllable range, it switches to a short brake with the use of the switch. Therefore, the method to increase the current in Japanese Unexamined Patent Application Publication No. 2007-189770 is positioned as measures that supplement the output short-circuit method with the use of the switch.

As a power converter circuit and its control circuit of power generation output described in Japanese Unexamined Patent Application Publication No. 2007-189770 require a driving power source, when such power source is lost, such circuits are unable to operate nor generate a brake torque. Further, it is difficult to flexibly and skillfully control the degree of the brake torque provided for the AC generator, i.e., the windmill.

Considering the above-described problems, the object of the invention is to provide a brake device which can generate a brake torque to the AC generator such as a wind-power generation device, and flexibly control the brake torque for the AC generator as well as correctly function even when the driving power source of a control unit is lost.

In order to achieve the above-mentioned object, the invention provides the following configurations. Symbols within the brackets refer to symbols in the diagrams later described, and for reference purposes.

In one mode of the brake device for the AC generator of the invention is characterized by comprising: a triac (TR) that has a first terminal (T1) connected to one transmission line and a second terminal (T2) connected to the other transmission line of the AC generator; first switching units (Q1, Q2) inserted in and connected to a current path, connected in parallel between a gate (TG) and the second terminal (T2) of said triac (TR); and a second switching unit (Q3) which can switch between an ON-enabled state and an off-state of said first switching units (Q1, Q2), and in that when said first switching units (Q1, Q2) are in the ON-enabled state by said second switching unit (Q3), and if the absolute value of a line-to-line voltage exceeds a prescribed value, said first switching units (Q1, Q2) turn on using the line-to-line voltage as a driving power source, and also, in accordance with the polarity of the line-to-line voltage, a trigger current flows in said gate (TG) through said current path, which turns on said triac (TR), and a short-circuit current flows in between the transmission lines through said triac (TR).

In the above mode, when said second switching unit (Q3) is off, said first switching units (Q1, Q2) are in the ON-enabled state, and when said second switching unit (Q3) is on, said first switching units (Q1, Q2) are the off-state.

In the above mode, said second switching unit (Q3) is driven by another driving power source, and switched off when said another driving power source is lost.

In the above mode, the following configuration is possible:

Said first switching units (Q1, Q2) are comprised of first and second switching elements (Q1, Q2) equipped with a control terminal (G) which is inserted in and connected in series in an opposite direction to each other on said current path; a terminal (D1) of said first switching element (Q1) is connected to the gate (TG) of said triac (TR), and a terminal (D2) of said second switching element (Q2) is connected to the second terminal (T2) of said triac (TR); other terminals (S) of said first and second switching elements (Q1, Q2) are connected at a first common connecting point (P1), and control terminals (G) of said first and second switching elements (Q1, Q2) are connected at a second common connecting point (P2); and a terminal of said second switching unit (Q3) is connected at said first common connecting point (P1) and the other terminal is connected at said second common connecting point (P2).

In the above mode, the device is comprised of a rotational frequency detection unit (2) for detecting the rotational frequency of said AC generator, wherein switching of status of said first switching units (Q1, Q2) is conducted by said second switching unit (Q3) based on a rotational frequency detected by said rotational frequency detection unit (2).

Another mode of the brake device for the AC generator of the invention is also characterized by comprising the triac (TR) wherein the first terminal (T1) is connected with one of, and the second terminal (T2) is connected with the other of a pair of transmission lines of the AC generator; a switching unit (Q11) inserted in and connected to the current path, in parallel between the gate (TG) and the second terminal (T2) of said triac (TR); and a control unit (cs) which can switch on/off of said switching unit (Q11), and in that when said switching unit is on by said control unit (cs), a trigger current flows in said gate (TG) through said current path according to the polarity of a line-to-line voltage, which turns said triac (TR) on, and a short-circuit current flows between the transmission lines through said triac (TR).

In another mode: said switching unit (Q11) is a photo MOS relay.

In another mode: comprising said rotational frequency detection unit (2) for detecting the rotational frequency of said AC generator wherein switching of status of said first switching unit (Q11) is conducted by said control unit (cs) based on the rotational frequency detected by said rotational frequency detection unit (2).

In another mode of the brake device for the AC generator of the invention, the brake device has any of the above aspects, and said AC generator is an AC generator placed between each line of three transmission lines, and that said AC generator outputs a three-phase AC.

In another mode of the brake device for the AC generator of the invention, in any of the above aspects, said AC generator is an AC generator for a wind-power generation device.

In another mode of the brake device for the AC generator of the invention, in any of the above aspects, said AC generator is a permanent magnet synchronous generator.

The brake device of the invention is to put brakes on the AC generator by feeding a short-circuit current through a triac connected in between the transmission lines of the AC generator. As the on/off of the triac can be freely controlled by the control signal, the speed of braking can flexibly be controlled. Further, the brake device of the invention can be operated regardless of the polarity of the AC line-to-line voltage; either positive or negative.

An actual working unit of the brake motion in the brake device of the invention is configured in such a way that the unit can operate using the line-to-line voltage as a driving power source, i.e., using the power of the AC generator, and start automatically when a functional loss occurs to the control unit. Thus, when any abnormality occurs to the control unit, the device has a fail-safe function with which braking can be conducted correctly.

DETAILED DESCRIPTION

Referring to the diagram, detailed explanations are given below on the embodiment of the brake device for the AC generator according to the invention.

(1) First Embodiment

Figure 1:
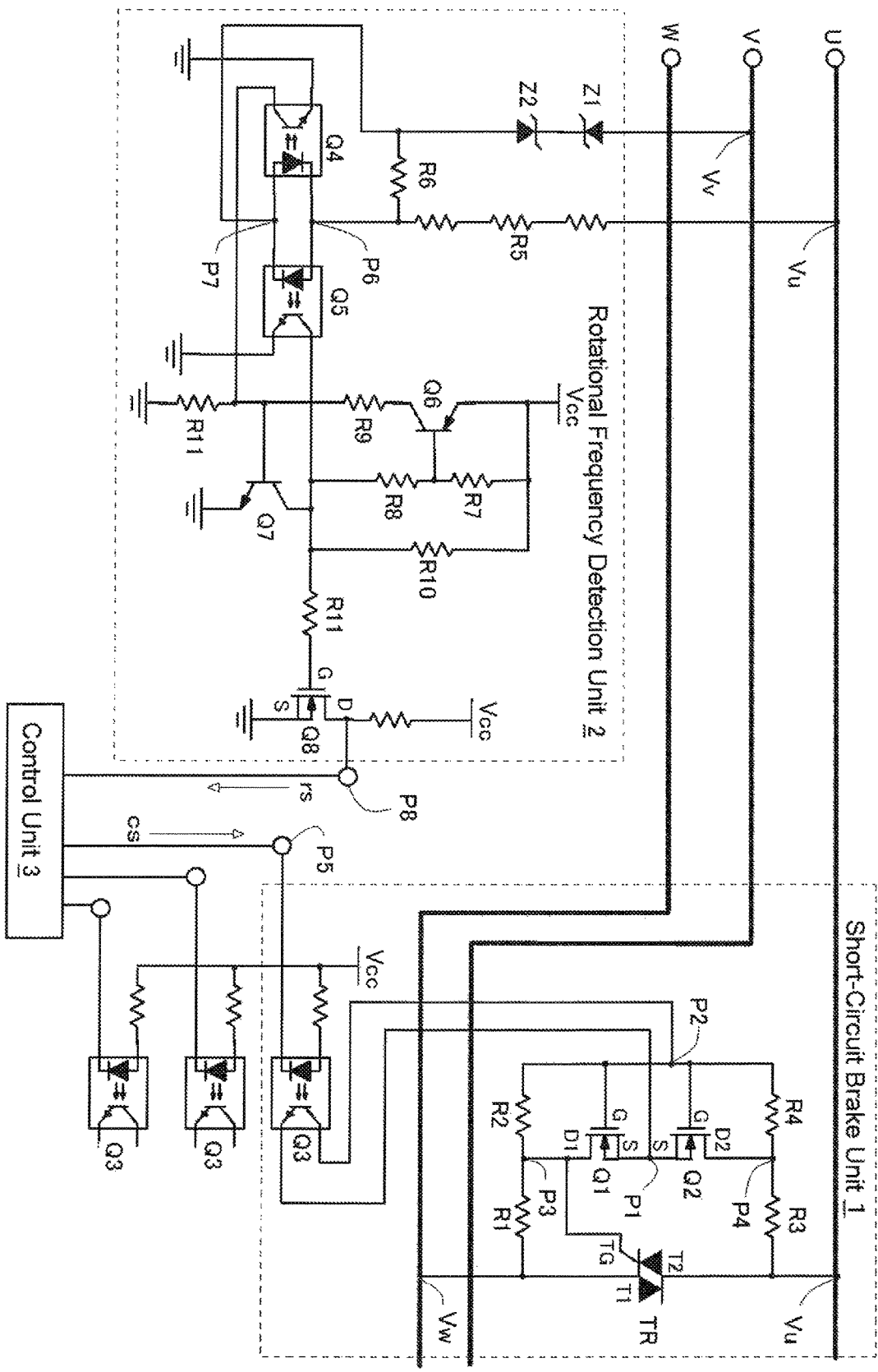
FIG. 1 shows a structural example of the first embodiment of the invention.

FIG. 1 shows a structural example of the first embodiment of the invention. The brake device for the AC generator according to the invention includes a short-circuit brake unit 1 to short-circuit between a pair of transmission lines which is an output of the AC generator (no diagram is given), the rotational frequency detection unit 2 to detect the rotational frequency of the AC generator and a control unit 3.

The AC generator to which the invention is applied is a permanent magnet synchronous generator. When appropriately, the device is applied to a three-phase AC output of the AC generator for wind-power generation. By short-circuiting line-to-line of the three-phase AC output, a short-circuit current flows in the AC generator, which generates a brake torque on the AC generator and controls the speed, which puts a brake on the rotation of a windmill.

The short-circuit brake unit 1 of the brake device of the invention can be independently set to each line-to-line of three lines of the three-phase AC output. When the short-circuit brake unit 1 is set on each of the three lines, putting a brake is possible by activating the short-circuit brake unit 1 in between at least two lines. Explanations are given below using the short-circuit brake unit 1 set on between the transmission lines U and W among the three-phase AC output, as an example; The exactly same configuration can be applied for a short-circuit brake unit (no diagram is given) set on other two lines. The rotational frequency detection unit 2 will be described at the end since any configuration can be used.

(1-1) Configuration of Short-Circuit Brake Unit of the First Embodiment

The short-circuit brake unit 1 includes a triac TR, which is a bi-directional thyristor connected in between the transmission lines U and W. The first terminal T1 of the triac TR is connected to the transmission line W, and the second terminal T2 is connected to the transmission line U. In other words, the triac TR is connected in parallel to the AC generator. A gate, which is a control terminal of the triac TR, is indicated as a symbol, TG.

In the diagram shown, the electric potential of the first terminal T1 of the triac TR is the same as that (Vw) of the transmission line W, and the electric potential of the second terminal T2 is the same as that (Vu) of the transmission line U. The voltage between both ends of the triac TR is a line-to-line voltage between the transmission line V and the transmission line W; Vu-Vw. When a trigger current with positive (inlet current) or negative (outflow current) flows into the gate TG, the triac TR becomes a conduction state (ON), which enables a main current to be fed in the direction of the polarity of the voltage between both ends, and when the main current is zero, it enables the triac TR to be off.

The short-circuit brake unit 1 includes a switching unit (the first switching unit) inserted and connected on the current path of a trigger current. The current path of trigger current is connected in parallel between the gate TG and the second terminal T2 of the triac TR. The switching unit comprises two switching elements Q1, Q2. The two switching elements Q1, Q2 have a control end each in a reverse serial connection with respect to one another.

As an example of the switching elements Q1, Q2, n-channel type MOSFET is used. Each source S of the switching element Q1 (hereinafter called "FETQ1") and the switching element Q2 (hereinafter called "FETQ2") is connected at a common connecting point P1. Further, each gate G, a control terminal of FET, is connected at a common connecting point P2. Thus, the FETQ1 and the FETQ2, which depend on the voltage between the common gate source, turn on/off at the same time.

A drain D1 of the FETQ1 is connected to the gate TG of the triac TR and a drain D2 of the FETQ2 is connected to the second terminal T2 of the triac TR (Transmission line U).

As another example, if the direction of the first terminal T1 and the second terminal T2 of the triac TR to the transmission lines U and W is reversed, the gate TG of the triac TR is connected to the drain D2 of the FETQ2.

Further, the common connecting point P2 of the gate G of the FETQ1 and the FETQ2 is connected to the drain D1 of the FETQ1 via a resistance R2, as well as connected to the drain D2 of the FETQ2 via a resistance R4. The drain D1 of the FETQ1 is connected to the first terminal T1 of the triac TR (transmission line W) via a resistance R1, and the drain D2 of the FETQ2 is connected to the second terminal T2 of the triac TR (transmission line U) via a resistance R3.

The short-circuit brake unit 1 also has a switching element Q3 (the second switching unit). The switching output terminal of the switching element Q3 is connected in between the common connecting point P1, which is the source S, and the common connecting point P2, which is the gate G of the FETQ1 and the FETQ2, and a control is carried out to conduct or block in between these connecting points. For the switching element Q3, it is preferred to use a photocoupler in which a control input terminal and the switching output terminal are electrically insulated. Here, as an example, a transistor coupler (hereinafter called "photocoupler Q3") is used. Since the triac TR is directly connected to the AC generator, it is preferred to electrically insulate the short-circuit brake unit 1 from the control unit 3.

In a built-in transistor, a switch output terminal of the photocoupler Q3, the collector is connected to the common connecting point P2, and the emitter is connected to the common connecting point P1; those can be switched. In a built-in light-emitting diode as the control input terminal of the photocoupler Q3, anode is connected to a positive power source Vcc, and cathode is connected to a control output terminal P5 of the control unit 3. A driving power source Vcc of the photocoupler Q3 is usually common to a driving power source of the control unit 3.

As the example shown, when the control signal cs of the control output terminal P5 is "L," the photocoupler Q3 is ON. At that time, since the common connecting points P1 and P2 are connected, the voltage between the gate source of the FETQ1 and the FETQ2 becomes zero, and the FETQ1 and the FETQ2 are OFF.

With the control signal cs being "H," the photocoupler Q3 is off. In this state, the common connecting points P1 and P2 are off, and a prescribed voltage is applied between the gate source of the FETQ1 and the FETQ2, according to the line-to-line voltage between the transmission lines U and W. When the voltage between the gate sources is the gate threshold voltage value or less, the FETQ1 and the FETQ2 turn OFF, and when the voltage exceeds the gate threshold value, the FETQ1 and the FETQ2 turn ON. When the FETQ1 and FETQ2 turn ON, a current flows in the current path of the FETQ1 and FETQ2 according to the polarity of the line-to-line voltage between the transmission lines U and W. It can be said that the line-to-line voltage between the transmission lines U and W serves as a driving power source of the FETQ1 and the FETQ2.

Even when the photocoupler Q3 is being OFF, the FETQ1 and the FETQ2 can be either ON or OFF, and whether these FET are ON or OFF depends on the line-to-line voltage between the transmission lines U and W. From this onward, the state of the FETQ1 and the FETQ2 when the photocoupler Q3 is being OFF will be referred as an "ON-enabled state (meaning that the state in which the FETQ1 and the FETQ2 can be ON depending on the condition.)"

Though no drawing is provided here, a short-circuit brake unit with exactly the same configuration is connected between the transmission lines U and V, and between the transmission lines V and W (Only the photocoupler Q3 is shown). FIG. 1 shows three control output terminals provided from the control unit 3 to control the short-circuit unit between respective lines. In this case, the control signal cs can be sent independently from the control unit 3 to switching element Q3 of each short-circuit brake unit.

As another example, one common control signal cs can be sent from the control unit 3 to the switching element Q3 of each short-circuit brake unit between respective lines. In this case, respective of the control input terminals (both terminals of the built-in light-emitting diode) of the three photocoupler Q3 is connected in series.

The short-circuit brake unit 1 can be configured replacing the FETQ1 and the FETQ2 with a p-channel type MOSFET.

(1-2) Motions of Short-Circuit Braking Unit

Figure 2:
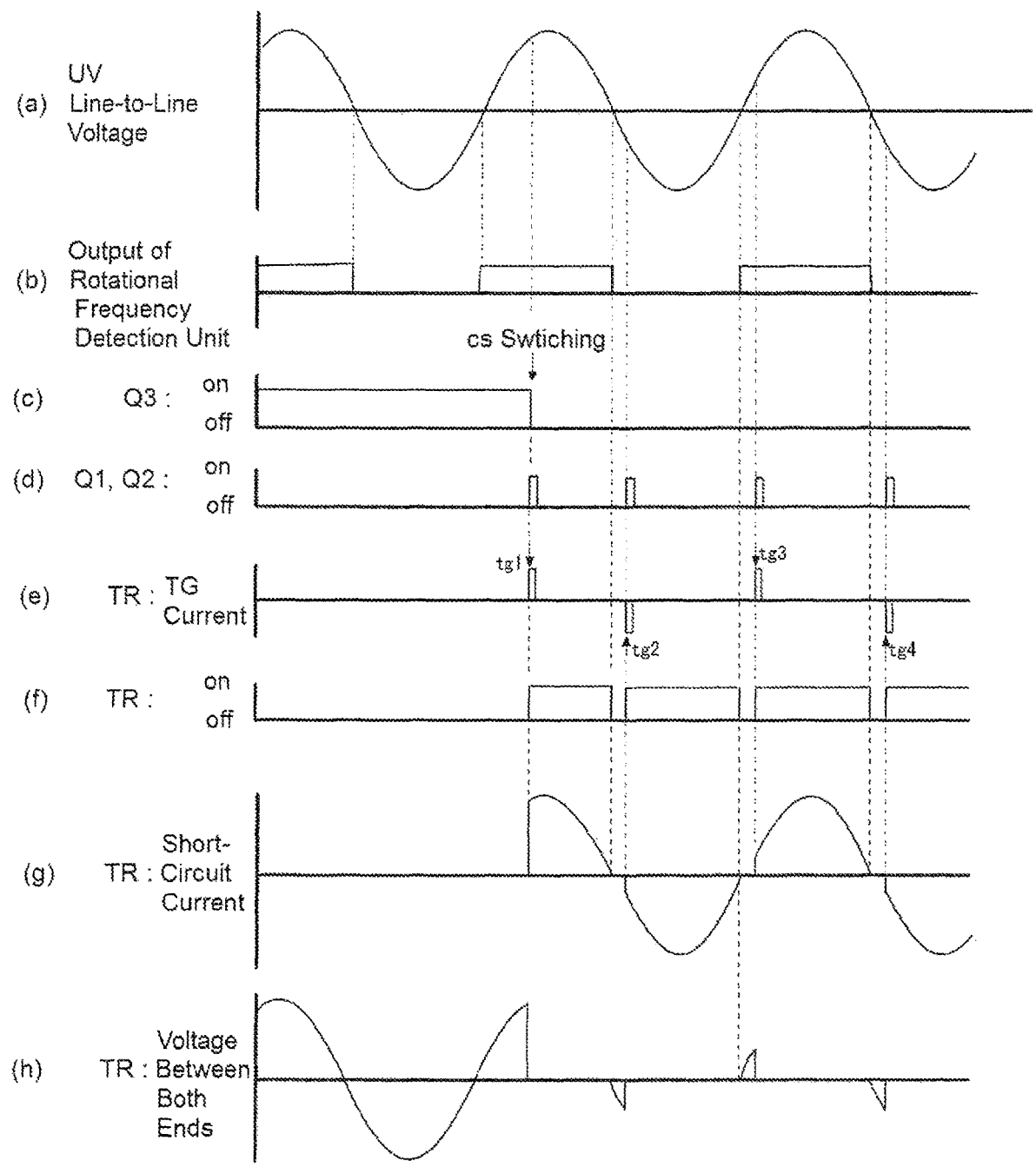
FIG. 2 shows a pattern diagram of an example of time change of the voltage, current or status in each position in operations of the brake device shown in FIG. 1.
Figure 3:
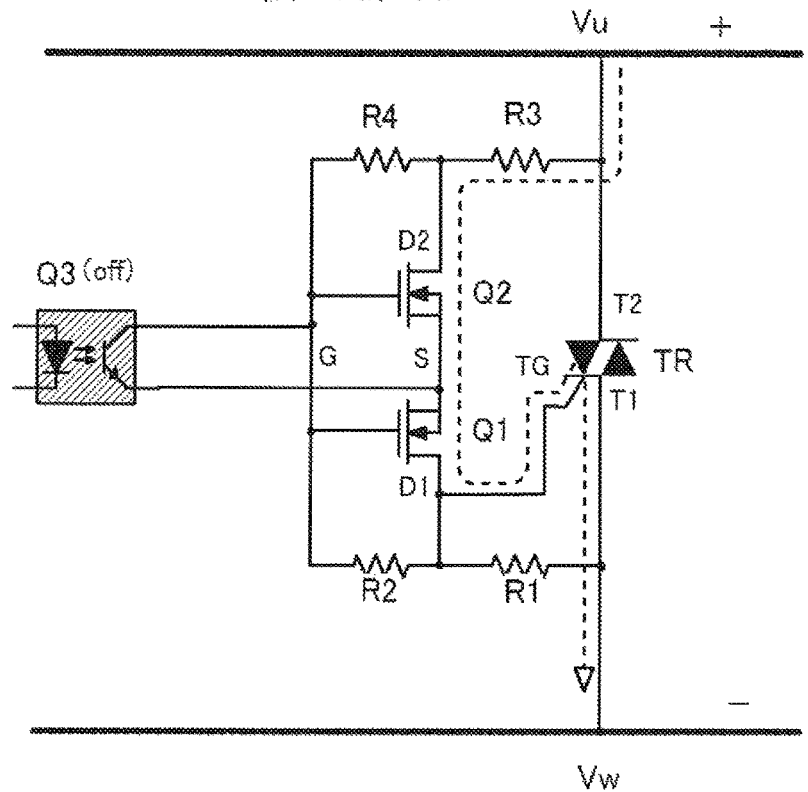
FIG. 3 shows a flow of trigger current in a short-circuit brake unit indicated in FIG. 1.
Figure 3:
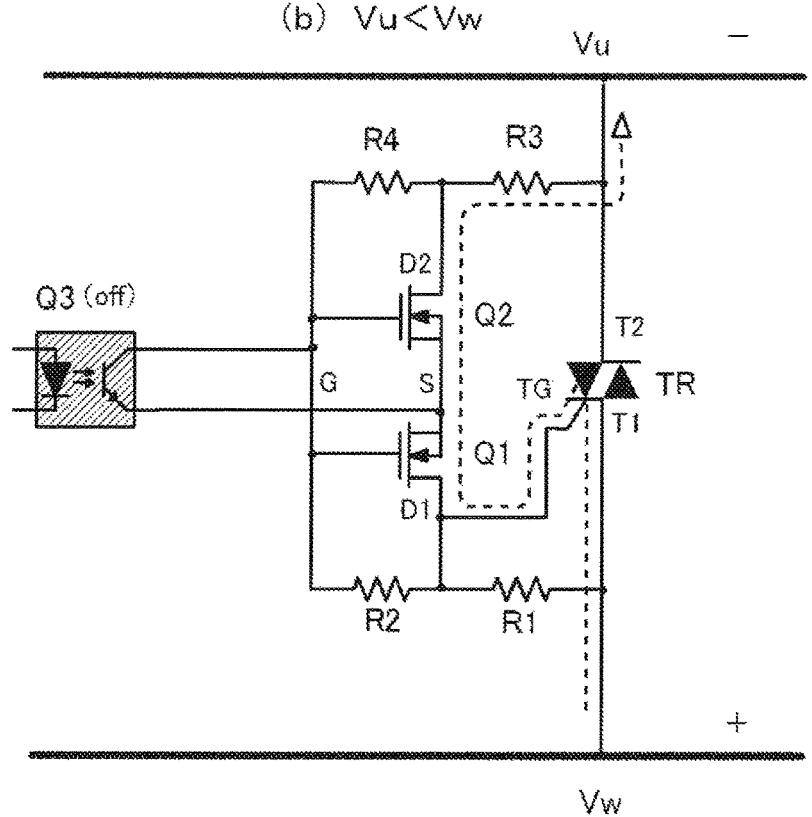

FIG. 2 (a)-(h) show examples of time change for the voltage, current or state of each place or each composing element in motions of the short-circuit brake unit 1 shown in FIG. 1 in a pattern. FIG. 3 shows a flow of trigger current in the short-circuit brake unit 1 shown in FIG. 1. By referring to FIGS. 2 and 3, motions of the short-circuit brake unit 1 will be described below.

FIG. 2 (a) shows the line-to-line voltage between the transmission lines U and W. FIG. 2 (b) shows an example of the output wavelength of the rotational frequency detection unit which will be described later. FIG. 2 (c) shows the ON/OFF state of the photocoupler Q3. FIG. 2 (d) shows the ON/OFF state of the FETQ2 and the FETQ3. FIG. 2 (e)

indicates a flow of trigger current which flows in the gate TG of the triac TR in a pattern. FIG. 2 (*f*) shows the ON/OFF state of the triac TR. FIG. 2 (*g*) shows the short-circuit current of the triac TR. FIG. 2 (*h*) indicates the voltage between both ends of the triac TR.

When There is No Brake Motion

In FIG. 2 (*c*), a period until the control signal cs to be input into the photocoupler Q3 is switched corresponds to a period with no brake motion.

When no brake is applied, the control signal cs from the control unit 3 in FIG. 1 will be maintained to "L". Thus, the photocoupler Q3 remains ON. (FIG. 2 (*c*)). Under such condition, the gate G and source S of the FETQ1 and the FETQ2 are connected. As the voltage between the gate and the source is zero, the FETQ1 and the FETQ2 remain OFF (FIG. 2 (*d*)).

When the FETQ1 and the FETQ2 remain OFF, a trigger current cannot flow in the gate TG of the triac TR, thus, the triac TR remains OFF.

When Brake Motion is Applied (i) Half Cycle Motion Including the Start Point of Brake Rotational frequency of the AC generator can be assessed from the frequency of the output pulse in the rotational frequency detection unit illustrated in FIG. 2 (*b*). When the rotational frequency exceeds the prescribed setting, the control signal cs is emitted from the control unit 3 to start the brake motion.

In FIG. 2 (*c*), when the control signal cs of "H" is input to the photocoupler Q3, the photocoupler Q3 turns OFF. Under such condition, the connection of the gate G and the source S of the FETQ1 and the FETQ2 will be blocked.

It is unspecified that the kickoff point of the brake motion will start at which point in the half cycle of the line-to-line voltage between the transmission lines U and W.

FIG. 3 (*a*) depicts the state wherein the electric potential Vu of the transmission line U is higher than that Vw of the transmission line W, i.e. the state right after the control signal cs is input when the polarity of the line-to-line voltage between the transmission lines U and W is positive. The triac TR has remained OFF before that point.

If the gate G and the source S of the FETQ1 and the FETQ2 are blocked, a difference in an electric potential occurs in the gate G and the source S according to the line-to-line voltage of the transmission lines U and W, and the voltage between the gate and the source applied. When the voltage between the gate and the source exceeds the gate voltage threshold value, the FETQ1 and the FETQ2 turn ON (FIG. 2 (*d*)).

In the example shown in FIG. 2, as the brake motion has started at the point when the absolute value of the line-to-line voltage of the transmission lines U and W is sufficiently large, the FETQ1 and the FETQ2 turn immediately ON. Even if the voltage between the gate and the source is the gate threshold value or less at the starting of the brake motion, the FETQ1 and the FETQ2 turn ON as soon as the absolute value of the line-to-line voltage of the transmission lines U and W has exceeded the gate threshold value.

When the FETQ1 and the FETQ2 turn ON, a trigger current flows in the positive direction in a route shown in dashed lines according to the positive polarity of the line-to-line voltage of the transmission lines U and W as shown below:

Transmission line U→resistance 3→FETQ2→FETQ1→gate TG of triac→the first terminal T1 of triac→transmission line W (FIG. 2 (*e*), tg1)

When the trigger current tg1 flows, the triac TR turns ON (FIG. 2 (*f*)). As a result, a short-circuit current flows in the triac TR according to the polarity of the line-to-line voltage of the transmission lines U and W (FIG. 2 (*g*)). This brings about the triac TR in the short circuit state, and the voltage between both ends falls to zero (FIG. 2 (*h*)). When the voltage between both ends of the triac TR falls to zero, the voltage between the gate and the source of the FETQ1 and the FETQ2 also falls to zero, and thus, the FETQ1 and the FETQ2 turn off (FIG. 2 (*d*)), and there will be no flow of trigger current (FIG. 2 (*f*)). The length of the time while the FETQ1 and the FETQ2 are ON, and the trigger current is flowing is extremely short.

The triac TR remains ON as long as the short-circuit current flows, even when the trigger current no longer flows. When a short-circuit current becomes zero at the end of the half cycle of the line-to-line voltage between the transmission lines U and W, the triac TR becomes off (FIG. 2 (*f*)).

(ii) Subsequent Motions of the Next Half Cycle

When the triac TR turns off, and the next negative half cycle of the line-to-line voltage between the transmission lines U and W begins, the absolute value of the line-to-line voltage of the transmission lines U and W starts to increase in the negative polarity; the opposite of the previous one. In this state, the absolute value of the voltage between both ends of the triac TR starts to increase in the negative polarity (FIG. 2 (*h*)).

FIG. 3 (*b*) depicts the state where the triac TR turns ON in the case when the electric potential Vu of the transmission line U is lower than that Vw of the transmission line W, i.e. when the polarity of the line-to-line voltage of the transmission lines U and W is negative. The triac TR has remained OFF before that point. When the polarity of the line-to-line voltage of the transmission lines U and W is negative, a difference in electric potential occurs in the gate G and the source S of the FETQ1 and the FETQ2, according to the line-to-line voltage of the transmission lines U and W, and the line voltage between the gate G and the source S is applied. When the voltage between the gate G and the source S exceeds the gate threshold value, the FETQ1 and the FETQ2 turn ON (FIG. 2 (*d*)).

As indicated above, the gate electric potential of the FETQ1 and the FETQ2 can be higher than the source electric potential of those when the polarity of the line-to-line voltage of the transmission lines U and W is either positive or negative. If the absolute value of the line-to-line voltage of the transmission lines U and W exceeds the prescribed value, the voltage between the gate G and the source S will exceed the gate threshold value, and the FETQ1 and the FETQ2 can turn ON. As a result, the brake motion can be conducted when the polarity of the line-to-line voltage is either positive or negative.

When the FETQ1 and the FETQ2 are ON, the trigger current flows in the negative direction in a route shown in dashed lines according to the negative polarity of the line-to-line voltage of the transmission lines U and W as shown below:

Transmission line W→the first terminal T1 of triac→gate TG of triac→FETQ1→FETQ2→resistance 3→transmission line U (FIG. 2 (e), tg2).

When the trigger current tg2 flows, the triac TR turns on (FIG. 2 (f)). As a result, a short-circuit current flows in the triac TR according to the polarity of the line-to-line voltage of the transmission lines U and W (FIG. 2 (g)). This brings about the triac TR in the short circuit state, and the voltage between both ends falls to zero (FIG. 2 (h). When the voltage between both ends of the triac TR falls to zero, the voltage between the gate and the source of the FETQ1 and the FETQ2 also falls to zero, and thus, the FETQ1 and the FETQ2 turn off (FIG. 2 (d)), and there will be no flow of trigger current (FIG. 2 (e)).

The triac TR remains ON as long as the short-circuit current flows, even when the trigger current no longer flows. When the short-circuit current falls to zero at the end of the negative half cycle, the triac TR turns off again (FIG. 2 (f)).

After that, the following series of motions will repeat: when a new half cycle of the line-to-line voltage of the transmission lines U and W starts, in line with the increase of the absolute value of the line-to-line voltage of the transmission lines U and W, the absolute value of the voltage between both ends of the triac TR starts rising; When the absolute value exceeds the prescribed value, the FETQ1 and the FETQ2 turn ON, then, the trigger current of the triac TR flows, and the triac turns ON; the short-circuit current flows; and the voltage between both ends of the triac TR falls to zero. This series of motions will continue while the photocoupler Q3 remains off.

After the short-circuit of the triac TR goes back to the AC generator, a brake torque is generated at the AC generator, which will put brakes on the rotation. If the AC generator is coupled to the windmill of the wind-power generation device via gear, a brake will be put on the rotation of the windmill.

(1-3) Characteristics of Control of Brake Motion

As described above, the line-to-line voltage of the transmission lines U and W (i.e. output power of the AC generator) as a driving power source, the FETQ1 and the FETQ2 turn ON, and with a flow of the trigger current, the triac TR turns ON and a short-circuit current will flow between the transmission lines U and W. Braking can be kept on when the control signal cs remains as "H" and the photocoupler Q3 remains off.

Switching and the length of each period of "H" and "L" of the control signal cs can be controlled flexibly by the control unit 3. For instance, by repeating "H" and "L" of the control signal cs for a certain period of time (longer than the cycle of the three-phase AC), a brake can be applied intermittently. With such, a brake can be kept applied in a moderate manner without causing a sudden machinery stress to the AC generator, and eventually, to the windmill. As indicated, a flexible brake motion is enabled by the control signal cs.

The driving power source Vcc of the photocoupler Q3 is usually common to the driving power source of the control unit 3. If the driving power source of the control unit 3 is lost for some reason such as electric outage, the driving power source Vcc of the photocoupler Q3 will also be lost, and the photocoupler Q3 will be turned off. The off-state of the photocoupler Q3 means that the FETQ1 and the FETQ2 are in the ON-enabled state, and the brake motion will start by the triac TR as described above. This is achieved by the driving power source of the triac TR, the FETQ1 and the FETQ2 is the line-to-line voltage of the transmission lines U and W itself. That means, the actual working unit of the brake device of the present invention operates by using the power of the AC generator. Accordingly, it can be said that the brake device in FIG. 1 has a fail safe function since a brake can be applied by such brake device when the driving power source of the control unit is lost.

(2) Second Embodiment

Figure 4:
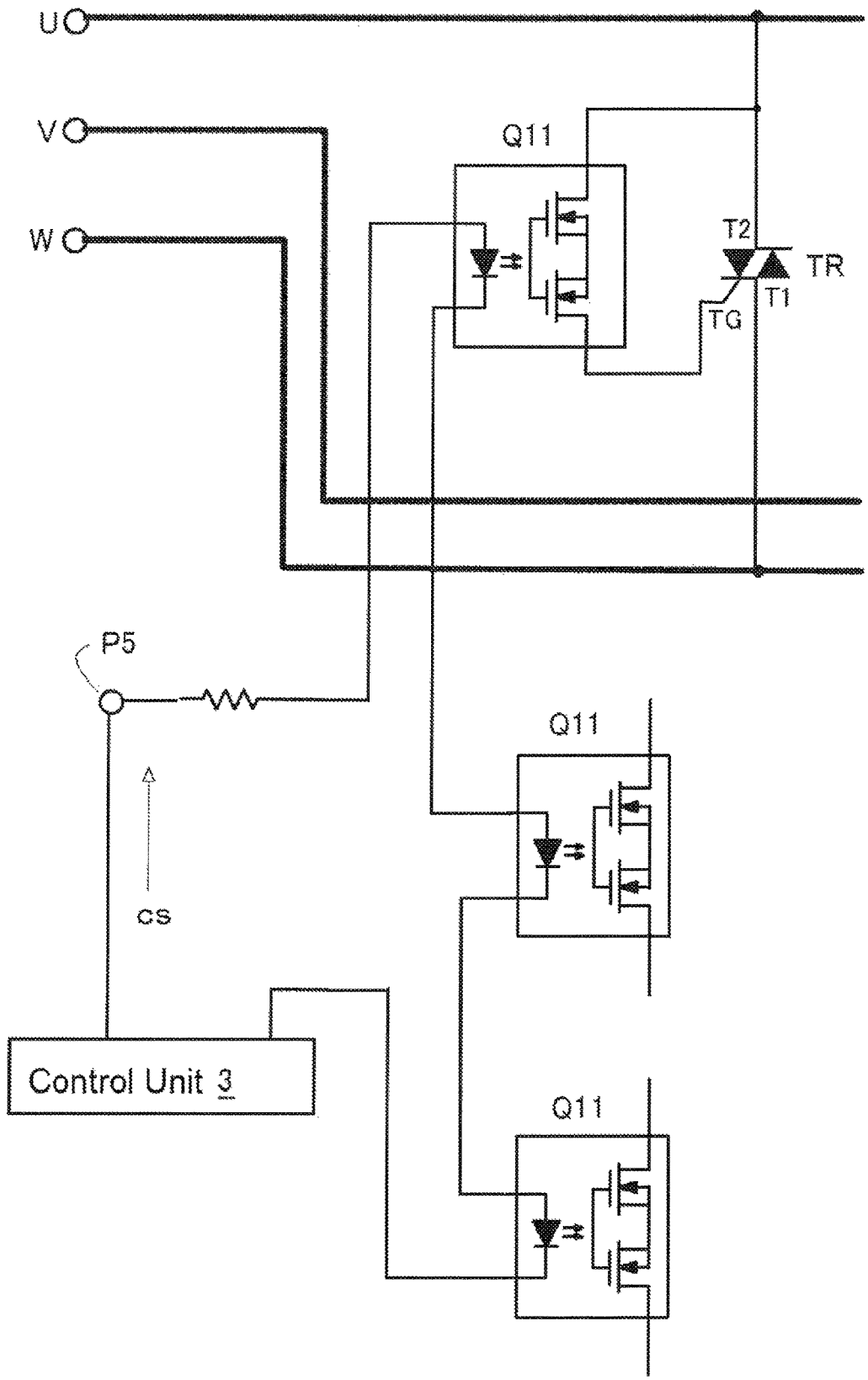
FIG. 4 shows a structural example of the second embodiment of the invention.

FIG. 4 shows a structural example of the second embodiment of the invention. Second embodiment has a short-circuit brake unit 1A different from the first embodiment shown in FIG. 1. As for the rotational frequency detection unit, a diagram will be omitted since the diagram is common to that of the first embodiment.

The short-circuit brake unit 1A has the triac TR in the same manner as the first embodiment. The first terminal T1 of the triac TR is connected to the transmission line W, and the second terminal T2 is connected to the transmission line U.

The short-circuit brake unit 1A has a switching unit 1 inserted and connected on the current path of the trigger current of the triac TR in the same manner as the first embodiment. The current path of the trigger current are connected in parallel between the gate TG and the second terminal T2 of the triac TR. The switching unit of the second embodiment is comprised of the switching element Q11. For the switching element Q11, it is preferred to use a photocoupler which can be electrically insulated from the control unit 3. As an example, a photo MOS relay is used here.

The photo MOS relay is an element embedded with light-emitting diode, photoelectric element charged by light-emitting diode, and two MOSFET which can be turned on by the gate voltage supplied by the photoelectric element. Built-in MOSFET is configured in a manner equivalent to the two MOSFET connected in series in an opposite direction to each other in the first embodiment. Both terminals of the built-in MOSFET are switch output terminals of the photo MOS relay.

One end of the switch output terminals of the photo MOS relay Q11 is connected to the gate TG of the triac TR, and the other end is connected to the second terminal T2 of the triac TR.

Switching ON/OFF of the build-in light-emitting diode of the photo MOS relay Q11 is done by the control signal cs input from the control signal terminal P5 of the control unit 3. While the build-in light-emitting diode remains ON by the control signal cs, the built-in MOSFET remains on and the continuity of the photo MOS relay Q11 is established. When the build-in light-emitting diode remains OFF, the photo MOS relay Q11 is blocked.

In FIG. 4, three photo MOS relay Q11 for each line of the three-phase AC are connected in series, and controlled by one common control signal cs. As in the first embodiment, a control can be done separately by the three control signals cs.

Next, the motion of a short-circuit brake unit 1A of the second embodiment will be described.

When brakes are not applied, the control signal cs is not output (or depending on the configuration, the OFF signal is output). As the photo MOS relay Q11 is off, the current path in which the trigger current of the triac TR flows are blocked, and thus, no trigger current flows. When the triac TR is off, the OFF-state remains and no short-circuit flows in the triac TR.

To start a brake, the control signal cs is input from the control unit 3 to turn on the MOS relay Q11. When the photo MOS relay Q11 is ON, a trigger current flows in the triac TR through the photo MOS relay Q11 according to the polarity of the line-to-line voltage of the transmission lines U and W at that time. When the polarity of such U, W line-to-line voltage is positive, the current flows in the gate TG, and when the polarity of such U, W line-to-line voltage is negative, the current flows out from the gate TG. This will turn the triac TR ON.

When the triac TR turns on, the short-circuit current flows in the triac TR according to the polarity of the line-to-line voltage of the transmission lines U and W. This will apply a braking on the AC generator. When the voltage between both ends of the triac TR falls to zero, the trigger current will be off. The triac TR remains ON as long as the short-circuit current continues to flow.

The triac TR turns off when a short-circuit current falls to zero at the point of the end of half-cycle of the line-to-line voltage of the transmission lines U and W. In the second embodiment, the photo MOS relay Q11 remains on by the control signal cs. Accordingly, when the next half-cycle starts, and immediately after the absolute value of the line-to-line voltage of the transmission lines U and W starts to increase, the trigger current in the opposite direction flows and the triac TR turns on. When the short-circuit current of the triac TR flows, the voltage of both ends of the triac TR falls to zero, and the trigger current turns off. The short-circuit current continues to flow in the triac TR. By repeating a series of motions, brakes can be kept applied in the AC generator.

In the same manner as the first embodiment, by adjusting the on-period and off period of the control signal cs, brakes can be applied flexibly varying the speed. Unlike the first embodiment, however, in the second embodiment, when functions of the control unit 3 is lost, such as losing of the driving power source of the control unit 3, since the photo MOS relay Q11 turns off, the short-circuit brake unit 1A cannot apply the brakes.

The photo MOS relay can be replaced by a photocoupler with the switch function in both directions.

(3) Configuration and Motions of Rotational Frequency Detection Unit

Configurations and motions of the rotational frequency detection unit 2 shown in FIG. 1 are described here. The rotational frequency detection unit 2 shown in FIG. 1 detects rotational frequency using the line-to-line voltage of the transmission lines U and V. Which line-to-line voltage of the three phases is used for detecting the rotational frequency is arbitrary.

Photocouplers Q4, Q5 are turned on/off exclusively according to the polarity of the line-to-line voltage of the transmission lines U and V. The transmission lines and the detection circuit are electrically insulated by the photocoupler. The transmission line U is connected to a point P6, which is cathode of the built-in light-emitting diode of the photocoupler Q4 as well as anode of the built-in light-emitting diode of the photocoupler Q5, through resistance R5. Thus, the electric potential Vu is reflected on the electric potential of the point P6. The transmission line V is connected to a point P7, which is cathode of the built-in light-emitting diode of the photocoupler Q4 as well as anode of the built-in light-emitting diode of the photocoupler Q5, through reversed polarity Zener diodes Z1, Z2 connected in series. Thus, the electric potential Vv is reflected on the electric potential of the point P7.

Countermeasures for noise in the vicinity of the polarity switching point of the line-to-line voltage of the transmission lines U and V, hysteresis is set up by the Zener diodes Z1, Z2.

An output terminal P8 of the rotational frequency detection unit 2 is the drain of a n-type MOSFETQ8. When the FETQ8 is off, the output terminal P8 is Vcc potential and "H". When the FETQ8 is on, the output terminal P8 is nearly a grounding potential and "L". When the output signal rs of these "H" and "L" is output according to the positive or negative polarity of the line-to-line voltage of the transmission lines U and V, the rotational frequency can be detected.

The output of the photocouplers Q4, Q5, is connected to a thyristor equivalent circuit comprised of a p-type transistor Q6 and a n-type transistor Q7.

When the point P6 is positive and the point P7 is negative, the photocoupler Q4 is off and the photocoupler Q5 is on. In this condition, a base current flows in the transistor Q6, and the transistor Q6 turns on. With the collector current of the transistor Q6, the base current flows in the transistor Q7, and the transistor Q7 turns on. With the collector current of the transistor Q7, the base current of the transistor Q6 flows. With this loop, the transistors Q6 and Q7 are in the self-holding state. As a result, the gate potential of the FETQ8 is grounded, and the FETQ8 turns off, which causes the output signal of "H," rs, to be output at the output terminal P8.

When the point P6 is negative and the point P7 is positive, the photocoupler Q4 turns on and the photocoupler Q5 turns off. In this condition, no base current flows in the transistor Q7, which turns the transistor Q7 off. Then, no base current flows in the transistor Q6, which turns the transistor Q6 off. As a result, Vcc potential is applied to the gate potential of the FETQ8, and the FETQ8 turns on, which causes the output signal "L," rs, to be output at the output terminal P8.

Not limited to the examples of the diagrams, as long as the rotational frequency of the AC generator (no diagram is shown) is detectable, any configuration can be used for the rotational frequency detection unit 2. Further, instead of directly detecting the rotational frequency of the AC generator, a configuration which can detect another parameter corresponding to the rotational frequency may be used. In the case of the wind-power generation device, since the purpose of detecting the rotational frequency of the AC generator is to detect the rotational frequency or rotational speed of a windmill, a configuration which can detect a parameter corresponding to the rotational frequency or rotational speed of a windmill may be used.

(4) Other Embodiments

The brake device for the AC generator of this invention is, based on the principle, not limited to a three-phase AC generator, but, applicable to a single phase AC generator.

In this invention, not limited to the configuration examples illustrated and described, but, as long as complying with the principles of the illustrated embodiments, other embodiments changed in shape are included in the scope of this invention.

REFERENCE NUMERALS

Q1-Q8, Q11 Switching elements
U, V, W Three-phase AC transmission lines
Vu, Vv, Vw Three-phase transmission line potential
TR Triac
Z1, Z2 Zener diode A brake device for an AC generator, whose speed can be flexibly controlled, and can function properly even when functions of the control unit are lost.

The brake device has a triac (TR) that has a first terminal connected to one transmission line, and a second terminal connected to the other transmission line of the AC generator; first switching units (Q1, Q2) inserted in and connected to a current path, which is connected in parallel between the second terminal and a gate (TG) of the triac (TR); a second switching unit (Q3) which can switch between an ON-enabled state and an OFF-state of said first switching units (Q1, Q2), and when the first switching unit is the ON-enabled state by the second switching unit (Q3), if the absolute value of a line-to-line voltage exceeds the prescribed value, the first switching units turn on using the line-to-line voltage as a driving power source, and in accordance with the polarity of the line-to-line voltage, a trigger current flows in the gate (TG) through said current path, which turns on said triac (TR), and a short-circuit current flows in between the transmission lines.

The present disclosure may include one or more of the following concepts:

A. A brake device for an AC generator comprising:
   a triac (TR) that has a first terminal (T1) connected to one of, and a second terminal (T2) connected to the other of a pair of transmission lines of the AC generator;
   first switching units (Q1, Q2) inserted in and connected to a current path, connected in parallel between a gate (TG) and the second terminal (T2) of said triac (TR); and
   a second switching unit (Q3) which can switch between an ON-enabled state and an off-state of said first switching units (Q1, Q2), wherein
   when said first switching units (Q1, Q2) are in the ON-enabled state by said second switching unit (Q3), if the absolute value of a line-to-line voltage exceeds the prescribed value, said first switching units (Q1, Q2) turn on using the line-to-line voltage as a driving power source, and in accordance with the polarity of the line-to-line voltage, a trigger current flows in said gate (TG) through said current path, which turns on said triac (TR), and a short-circuit current flows in between the transmission lines through said triac (TR).

B. The device in accordance with paragraph A, characterized in that when said second switching unit (Q3) is off, said first switching units (Q1, Q2) are in the ON-enabled state, and when said second switching unit (Q3) is on, said first switching units (Q1, Q2) are in the off-state.

C. The device in accordance with paragraph B, characterized in that said second switching unit (Q3) is driven by another driving power source, and switched off when said another driving power source is lost.

D. The device in accordance with any of the previous paragraphs, characterized in that said first switching units (Q1, Q2) are comprised of first and second switching elements (Q1, Q2) equipped with a control terminal (G) which is inserted in and connected in series in an opposite direction to each other to said current path;
   a terminal (D1) of said first switching element (Q1) is connected to the gate (TG) of said triac (TR), and a terminal (D2) of said second switching element (Q2) is connected to the second terminal (T2) of said triac (TR);
   other terminals (S) of said first and second switching elements (Q1, Q2) are connected at a first common connecting point (P1), and control terminals (G) of said first and second switching elements (Q1, Q2) are connected at a second common connecting point (P2); and
   a terminal of said second switching unit (Q3) is connected at said first common connecting point (P1) and the other terminal is connected at said second common connecting point (P2).

E. The device in accordance with any of the previous paragraphs, comprising: a rotational frequency detection unit (2) for detecting the rotational frequency of said AC generator, wherein switching of status of said first switching units (Q1, Q2) is conducted by said second switching unit (Q3) based on a rotational frequency detected by said rotational frequency detection unit (2).

F. The device comprising: the triac (TR) wherein the first terminal (T1) is connected to one of, and the second terminal (T2) is connected to the other of a pair of transmission lines of the AC generator;
   a switching unit (Q11) inserted in and connected to the current path, in parallel between the gate (TG) and the second terminal (T2) of said triac (TR); and
   a control unit (cs) which can switch on/off of said switching unit (Q11), wherein
   when said switching unit is on by said control unit (cs), a trigger current flows in said gate (TG) through said current path according to the polarity of a line-to-line voltage, which turns said triac (TR) on, and a short-circuit current flows between the transmission lines through said triac (TR).

G. The device in accordance with paragraph F, characterized in that said switching unit (Q11) is a photo MOS relay.

H. The device in accordance with paragraphs F or G, comprising: said rotational frequency detection unit (2) for detecting the rotational frequency of the AC generator, wherein switching of status of said first switching unit (Q11) is conducted by said control unit (cs) based on the rotational frequency detected by said rotational frequency detection unit (2).

I. The device in accordance with any of the previous paragraphs, characterized by being placed between each of three transmission lines, wherein said AC generator outputs a three-phase AC.

J. The device in accordance with any of the previous paragraphs, characterized by said AC generator being an AC generator for a wind-power generation device.

K. The device in accordance with any of the previous paragraphs, characterized by said AC generator being a permanent magnet synchronous generator.

What is claimed is:

1. A brake device for an AC generator comprising:
   a triac including:
      a first terminal electrically connected to a first transmission line of the AC generator,
      a second terminal electrically connected to a second transmission line of the AC generator, and
      a gate;
   a first switching unit electrically connected between the gate and the second terminal and configured to receive power from the AC generator;
   a second switching unit configured to switch the first switching unit between an ON-enabled state and an off-state;
   wherein, when the first switching unit is in the ON-enabled state and the absolute value of a line-to-line voltage between the first transmission line and the second transmission line exceeds a selected value, the first switching unit turns on using the line-to-line voltage as a driving power source and triggers a short-circuit current flow in between the transmission lines through the triac;

wherein the first switching unit is in the ON-enabled state when the second switching unit is off, and the first switching unit is in the off-state when the second switching unit is on;

wherein the second switching unit and a control unit configured to control the switching of the second switching unit are powered by a common power source different than the AC generator; and wherein the second switching unit is configured to automatically switch off when the common power source is lost.

2. The brake device according to claim 1, wherein the first switching unit comprises a first switching element and a second switching element each connected to a control terminal;

wherein a first switch terminal of the first switching element is connected to the gate, and a second switch terminal of the second switching element is connected to the second terminal;

wherein a third switch terminal of the first switching element and a fourth switch terminal of the second switching element are connected to a first common point;

wherein a first control terminal of the first switching element and second control terminal of the second switching elements are connected to a second common point; and wherein a fifth switch terminal of the second switching unit is connected to the first common point and a sixth switch terminal of the second switching unit is connected to the second common point.

3. The brake device according to claim 1, further comprising:

a rotational frequency detection unit configured to measure the rotational frequency of the AC generator;

wherein switching of the second switching unit is based on a selected rotational frequency measured by the rotational frequency detection unit.

4. The brake device according to claim 1, wherein the AC generator outputs a three-phase AC.

5. The brake device according to claim 1, wherein the AC generator comprises a wind-power generation device.

6. The brake device according to claim 1, wherein the AC generator comprises a permanent magnet synchronous generator.

7. A brake device for an AC generator comprising:

a triac including:
a first terminal electrically connected to a first transmission line of the AC generator,
a second terminal electrically connected to a second transmission line of the AC generator, and
a gate; and a first switching unit electrically connected between the gate and the second terminal and configured to receive power from the AC generator;

wherein, when a voltage between the first transmission line and the second transmission line exceeds a selected value, the first switching unit triggers a short-circuit current flow between the first and second transmission lines.

8. The brake device according to claim 7, further comprising:

a second switching unit configured to disable the first switching unit when the second switching unit is on.

9. The brake device according to claim 8, wherein the second switching unit is powered by a secondary power source and configured to automatically switch off when the secondary power source is lost.

* * * * *